United States Patent
Smith et al.

(10) Patent No.: US 9,965,604 B2
(45) Date of Patent: May 8, 2018

(54) DE-DUPLICATION OF PER-USER REGISTRATION DATA

(71) Applicant: Microsoft Technology Licensing, LLC, Redmond, WA (US)

(72) Inventors: Phillip E. Smith, Sammamish, WA (US); William L. Cheng, Redmond, WA (US); Jason Salameh, Bothell, WA (US); Andres C. Petralli, Redmond, WA (US); Adam D. Stritzel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 92 days.

(21) Appl. No.: 14/850,897

(22) Filed: Sep. 10, 2015

(65) Prior Publication Data

US 2017/0076075 A1 Mar. 16, 2017

(51) Int. Cl.
*G06F 21/31* (2013.01)
*G06F 9/44* (2018.01)
*G06F 9/445* (2018.01)

(52) U.S. Cl.
CPC ............... *G06F 21/31* (2013.01); *G06F 9/44* (2013.01); *G06F 9/4451* (2013.01)

(58) Field of Classification Search
CPC .. G06F 21/31; G06F 3/04842; G06F 3/04817; G06F 3/0484; G06F 21/566; G06F 2221/033; G06F 9/44; H04L 63/1425; H04L 63/101; G06N 99/005
See application file for complete search history.

(56) References Cited

U.S. PATENT DOCUMENTS

| | | | |
|---|---|---|---|
| 5,579,509 A | | 11/1996 | Furtney et al. |
| 5,758,154 A | * | 5/1998 | Qureshi ............... G06F 9/44505 713/1 |
| 5,890,175 A | | 3/1999 | Wong et al. |
| 6,012,053 A | | 1/2000 | Pant et al. |
| 6,167,441 A | | 12/2000 | Himmel |
| 6,178,511 B1 | | 1/2001 | Cohen et al. |
| 6,347,398 B1 | | 2/2002 | Parthasarathy et al. |
| 6,374,102 B1 | | 4/2002 | Brachman et al. |

(Continued)

OTHER PUBLICATIONS

Office action for U.S. Appl. No. 12/960,327, dated Sep. 15, 2015, Bruno et al., "Meta-Application Framework", 22 pages.

(Continued)

*Primary Examiner* — HOsuk Song
*Assistant Examiner* — J. Brant Murphy
(74) *Attorney, Agent, or Firm* — Arent Fox LLP (57) ABSTRACT

Registration of an application in a per-user registration model includes the creation and storage of duplicate registration data for multiple user accounts present on a system. This duplication of registration data may be reduced by storing at least a portion of identical data in a per-machine location in the system memory where it is accessible to all user accounts. Instead of needing to separately re-compute and/or re-store duplicate registration data in multiple per-user locations in the memory, each user account may access and utilize the registration data stored in the per-machine location. Pre-computing and storing a portion of the application registration data in a per-machine location in the memory may also allow the system to defer the registration of the application.

20 Claims, 6 Drawing Sheets

(56) References Cited

U.S. PATENT DOCUMENTS

| | | | |
|---|---|---|---|
| 6,453,361 B1 | 9/2002 | Morris | |
| 6,466,238 B1* | 10/2002 | Berry | G06F 9/4443 |
| | | | 707/999.202 |
| 6,523,166 B1 | 2/2003 | Mishra et al. | |
| 6,615,191 B1* | 9/2003 | Seeley | G06F 21/10 |
| | | | 705/39 |
| 6,754,470 B2 | 6/2004 | Hendrickson et al. | |
| 7,016,919 B2 | 3/2006 | Cotton et al. | |
| 7,100,195 B1 | 8/2006 | Underwood | |
| 7,158,943 B2 | 1/2007 | van der Riet | |
| 7,158,966 B2 | 1/2007 | Brill et al. | |
| 7,240,055 B2 | 7/2007 | Grasso et al. | |
| 7,257,583 B2 | 8/2007 | Hofmeister et al. | |
| 7,490,045 B1 | 2/2009 | Flores et al. | |
| 7,537,158 B1 | 5/2009 | Cox et al. | |
| 7,548,949 B2 | 6/2009 | Anderson | |
| 7,599,901 B2 | 10/2009 | Mital et al. | |
| 7,599,918 B2 | 10/2009 | Shen et al. | |
| 7,698,327 B2 | 4/2010 | Kapur | |
| 7,716,225 B1 | 5/2010 | Dean et al. | |
| 7,739,690 B2 | 6/2010 | Sedukhin et al. | |
| 7,779,064 B2 | 8/2010 | Phillips | |
| 7,783,729 B1 | 8/2010 | Macaluso | |
| 8,260,736 B1 | 9/2012 | Lear et al. | |
| 8,478,812 B2 | 7/2013 | Oliver et al. | |
| 8,635,204 B1 | 1/2014 | Xie et al. | |
| 8,650,543 B1 | 2/2014 | Winch | |
| 8,713,560 B2 | 4/2014 | Neumann et al. | |
| 8,930,939 B2 | 1/2015 | Kline et al. | |
| 9,239,762 B1* | 1/2016 | Gunda | G06F 11/1448 |
| 9,344,433 B2* | 5/2016 | Adams | H04L 63/102 |
| 2001/0047363 A1 | 11/2001 | Peng | |
| 2003/0191737 A1 | 10/2003 | Steele et al. | |
| 2004/0034853 A1 | 2/2004 | Gibbons et al. | |
| 2004/0043763 A1 | 3/2004 | Minear et al. | |
| 2005/0070259 A1 | 3/2005 | Kloba et al. | |
| 2005/0080780 A1 | 4/2005 | Colledge et al. | |
| 2005/0102215 A1 | 5/2005 | Ausubel et al. | |
| 2005/0120113 A1 | 6/2005 | Bunch et al. | |
| 2005/0191737 A1 | 9/2005 | Iwamoto et al. | |
| 2006/0036510 A1 | 2/2006 | Westphal et al. | |
| 2006/0067244 A1 | 3/2006 | Sekaran et al. | |
| 2006/0136389 A1 | 6/2006 | Cover et al. | |
| 2006/0155672 A1 | 7/2006 | Lee et al. | |
| 2006/0161520 A1 | 7/2006 | Brewer et al. | |
| 2006/0242138 A1 | 10/2006 | Brill et al. | |
| 2006/0259964 A1 | 11/2006 | Maldonado et al. | |
| 2007/0028266 A1 | 2/2007 | Trajkovic et al. | |
| 2007/0061242 A1 | 3/2007 | Ramer et al. | |
| 2007/0073717 A1 | 3/2007 | Ramer et al. | |
| 2007/0088603 A1 | 4/2007 | Jouppi et al. | |
| 2007/0112948 A1* | 5/2007 | Uhlik | H04L 12/14 |
| | | | 709/223 |
| 2007/0179863 A1 | 8/2007 | Stoll | |
| 2007/0239682 A1 | 10/2007 | Arellanes et al. | |
| 2007/0266305 A1 | 11/2007 | Cong et al. | |
| 2007/0294240 A1 | 12/2007 | Steele et al. | |
| 2008/0065630 A1 | 3/2008 | Luo et al. | |
| 2008/0207182 A1 | 8/2008 | Maharajh et al. | |
| 2008/0228503 A1 | 9/2008 | Buchheit | |
| 2008/0235179 A1 | 9/2008 | Kurien et al. | |
| 2008/0270561 A1 | 10/2008 | Tang et al. | |
| 2008/0307047 A1 | 12/2008 | Jowett et al. | |
| 2009/0064055 A1* | 3/2009 | Chaudhri | G06F 3/04817 |
| | | | 715/863 |
| 2009/0158164 A1* | 6/2009 | Nadeem | G06F 21/64 |
| | | | 715/741 |
| 2009/0171721 A1 | 7/2009 | LeBaron et al. | |
| 2009/0216609 A1 | 8/2009 | Westphal | |
| 2009/0222842 A1 | 9/2009 | Narayanan et al. | |
| 2009/0228439 A1 | 9/2009 | Manolescu et al. | |
| 2009/0240586 A1 | 9/2009 | Ramer et al. | |
| 2009/0247078 A1 | 10/2009 | Sklovsky et al. | |
| 2010/0003923 A1 | 1/2010 | McKerlich et al. | |
| 2010/0010994 A1 | 1/2010 | Wittig et al. | |
| 2010/0017392 A1 | 1/2010 | Dian | |
| 2010/0100839 A1 | 4/2010 | Tseng et al. | |
| 2010/0124911 A1 | 5/2010 | Leeder | |
| 2010/0145978 A1 | 6/2010 | Anashkin et al. | |
| 2010/0233996 A1 | 9/2010 | Herz et al. | |
| 2010/0306191 A1 | 12/2010 | LeBeau et al. | |
| 2011/0047594 A1 | 2/2011 | Mahaffey et al. | |
| 2011/0119287 A1 | 5/2011 | Chen et al. | |
| 2011/0161912 A1 | 6/2011 | Eteminan et al. | |
| 2011/0209143 A1 | 8/2011 | Ierullo | |
| 2011/0258301 A1 | 10/2011 | McCormick et al. | |
| 2011/0276598 A1 | 11/2011 | Kozempel | |
| 2011/0289015 A1 | 11/2011 | Mei et al. | |
| 2011/0314004 A1 | 12/2011 | Mehta | |
| 2012/0053829 A1 | 3/2012 | Agarwal et al. | |
| 2012/0054167 A1 | 3/2012 | Chi et al. | |
| 2012/0240236 A1 | 9/2012 | Wyatt et al. | |
| 2012/0284256 A1 | 11/2012 | Mahajan et al. | |
| 2013/0218923 A1* | 8/2013 | Kaul | G06F 17/30864 |
| | | | 707/769 |
| 2014/0007057 A1 | 1/2014 | Gill et al. | |
| 2014/0114901 A1 | 4/2014 | Pradhan et al. | |
| 2014/0149399 A1 | 5/2014 | Kurzion | |
| 2014/0250098 A1 | 9/2014 | Kasterstein et al. | |
| 2015/0026455 A1* | 1/2015 | Enderwick | G06F 21/606 |
| | | | 713/153 |
| 2016/0021115 A1* | 1/2016 | Adams | H04L 63/102 |
| | | | 726/6 |
| 2016/0112470 A1* | 4/2016 | Pai | H04L 41/0806 |
| | | | 709/223 |
| 2016/0261537 A1* | 9/2016 | Yang | H04L 51/12 |
| 2017/0078377 A1 | 3/2017 | Smith et al. | |

OTHER PUBLICATIONS

Office action for U.S. Appl. No. 12/960,327, dated Jan. 22, 2016, Bruno Jr. et al., "Meta-Application Framework", 12 pages.

Office action for U.S. Appl. No. 12/945,207, dated Dec. 3, 2015, Macbeth et al., "Application Transfer Protocol", 25 pages.

Office action for U.S. Appl. No. 12/944,899, dated Dec. 4, 2015, Tullis et al., "Unified Application Discovery across Application Stores", 23 pages.

Office action for U.S. Appl. No. 12/945,061, dated Feb. 2, 2016, MacBeth et al., "Rich Search Over and Deep Integration with Applications", 17 pages.

Office action for U.S. Appl. No. 12/960,267, dated Feb. 2, 2016, Zargahi et al., "Using Behavioral Data to Manage Computer Services", 27 pages.

Office action for U.S. Appl. No. 12/945,207, dated May 2, 2016, MacBeth et al., "Application Transfer Protocol", 29 pages.

Office action for U.S. Appl. No. 12/960,267, dated Jun. 17, 2016, Zargahi et al., "Using Behavioral Data to Manage Computer Services", 30 pages.

Office action for U.S. Appl. No. 12/945,061, dated Sep. 28, 2016, Macbeth et al., "Rich Search Over and Deep Integration with Applications", 23 pages.

Aktas, et al., "XML Metadata Services," retrieved on Jul. 12, 2010 at <<http://citeseerx.ist.psu.edu/viewdoc/download?doi=10.1.1.69.2190&rep=rep1&type=pdf>>, Proceedings of International Conference on Semantics, Knowledge and Grid (SKG), Guilin, CN, Nov. 2006, pp. 1-24.

"Application Compatibility Analyzer 1.0," Microsoft.com, retrieved on Jul. 2, 2015, available at <<https://www.microsoft.com/en-us/download/details.aspx?id=20398>>, 3 pages.

Bartz et al., "Finding Similar Failures Using Callstack Similarity," USENIX Association, In the Proceedings of the Third Conference on Tackling Computer Systems Problems With Machine Learning Techniques, 2008, pp. 1-13.

Bode, "Apple Hits Users With Behavioral Ads: Changes privacy policy, offers new opt-out option," retrieved on Aug. 11, 2010 at <<http://www.dslreports.com/shownews/Apple-Hits-Users-With-Behavioral-Ads-109005>> dslreports.com, Broadband, Jun. 22, 2010, pp. 1-15.

(56) References Cited

OTHER PUBLICATIONS

Cheng, "Google's new behavioral ads already raising privacy worries," retrieved on Aug. 11, 2010 at <<http://arstechnica.com/web/news/2009/03/googles-interest-based-ads-try-to-address-privacy-worries.ars>>, Conde Nast Digital, Ars Technica, Mar. 11, 2009, pp. 1-2.

Citrix.com, "Exploring Application compatibility methods," White Paper, available at <<https://www.citrix.com/content/dam/citrix/en_us/documents/products-solutions/exploring-application-compatibility-methods.pdf>>2012, 11 pages.

Constantinou, "Mobile App Stores: The Next Two Years." retrieved on Jul. 16, 2010 at <<http://www.visionmobile.com/blog/2009/10/mobile-app-stores-the-next-two-years/>>, Visionmobile, Oct. 30, 2009, pp. 1-15.

Edwards, "Carriers missing opportunity with app stores," retrieved on Jul. 6, 2010 at <<http://www.mobilecommercedaily.com/carriers-missing-opportunity-with-app-stores/>>, Mobile Commerce Daily, Jun. 14, 2010, pp. 1-3.

Essany, "Google Puts App Store Links in Mobile Search Results," retrieved on Jul. 16, 2010 at <<http://www.mobilemarketingwatch.com/google-puts-app-store-links-in-mobile-search-results-7190/>> Mobile Marketing Watch, Jun. 3, 2010, pp. 1-7.

Freeman, "Information is Everywhere Managing Information for Discovery and Search," retrieved on Jul. 15, 2010 at <<http://www.dexmar.com/website/dexcom4.nsf/c2f7f2b8d369f55b8025684d00603bab/9cb30babeb66fd4b802571650025d96e/$FILE/IBM%20Search%20and%20Discovery.ppt>>, IBM Software Group, May 2006, pp. 1-46

Garimella, "Understanding the Application Compatibility in Your Environment," retrieved on Jun. 29, 2015, available at <<https://technet.microsoft.com/en-us/library/ee449434(v=ws.10).aspx>> Feb. 20, 2011, 3 pages.

Grove, "Read or Update a Registry Key for All Users on a System," Mick's Mix, Jan. 13, 2012, 3 pages.

IBM.com, "Using the Lotus Notes Single User to Multi-User Migration Assistant (MUMA) Tool," retrieved on Jul. 3, 2015, available at <<http://www-01.ibm.com/support/docview.wss?uid=swg21459627>> Oct. 4, 2011, 5 pages.

Kats, "Ace Marketing, Blue Bite to launch proximity marketing network—news briefs," retrieved on Jul. 6, 2010 at <<http://www.mobilecommercedaily.com/today-in-mobile-commerce-news-briefs-2/>> Mobile Commerce Daily, Apr. 2, 2010, pp. 1-2.

Khnaser, "Cool, Free Virtualization Tool: Microsoft's RDS Application Compatibility Analyzer." available at: <<https://virtualizationreview.com/blogs/virtual-insider/2011/05/free-microsoft-rds-application-compatibility-analyzer.aspx>>, May 31, 2011, 4 pages.

Liang, "Inventory software with Microsoft's Application Compatibility Analyzer," available at <<http://www.techrepublic.com/article/inventory-software-with-microsofts-application-compatibility-analyzer/>>, Jun. 30, 2003, 14 pages.

Linthicum, "Mercator / Next Generation Application Integration, From Information, to Process, to Services," retrieved on Jul. 12, 2010 at <<http://bukovec.fei.tuke.sk/predmety/pdt/referaty/EnterpriseApplicationIntegration/Steller/zad1/wp_next_gen_app_integration.pdf>> Mercator Software, Wilton, CT, Oct. 2001, pp. 1-18.

Madden, "How Applications use the Registry in Terminal Server Environments," retrieved on Jul. 3, 2015, available at <<http://www.brianmadden.com/blogs/brianmadden/archive/2004/08/03/how-applications-use-the-registry-in-terminal-server-environments-part-2-of-3.aspx>> Aug. 3, 2015, 8 pages.

Marl, "User Data and Settings Management," retrieved on Jul. 3, 2015, available at <<https://technet.microsoft.com/en-us/library/bb490855.aspx>>, Aug. 1, 2001, 22 pages.

Microsoft.com, "Managing Default Applications," retrieved on Jul. 3, 2015, available at <<https://msdn.microsoft.com/en-us/library/windows/desktop/cc144160(v=vs.85).aspx>>Mar. 25, 2013, 6 pages.

Microsoft.com, "Registry Hives," retrieved on Jul. 3, 2015, available at <<https://msdn.microsoft.com/en-us/library/windows/desktop/ms724877(v=vs.85).aspx>>, Oct. 2, 2011, 2 pages.

Microsoft.com, "Run and RunOnce Registry Keys," retrieved on Jul. 3, 2015, available at <<https://msdn.microsoft.com/en-us/library/aa376977(v=vs.85).aspx>>, Jun. 29, 2015, 2 pages.

Microsoft.com, "Windows Registry Information for Advanced Users," retrieved on Jul. 3, 2015, available at <<https://support.microsoft.com/en-us/kb/256986>>, May 12, 2015, 13 pages.

Miyamura, "What Drives iTunes App Store Search Rankings?" retrieved on Jul. 16, 2010 at <<http://www.appsasabiz.com/2010/02/03/what-drives-itunes-app-store-search-rankings/>>apps as a biz, Feb. 3, 2010, pp. 1-6.

Mondok, "Microsoft behavioral advertising technology goes global," retrieved on Aug. 11, 2010 at <<http://arstechnica.com/microsoft/news/2006/12/6414.ars>>, Conde Nast Digital, Ars Technica, Dec. 28, 2006, 1 page.

O'Connor et al., "PolyLens: A Recommender System for Groups of Users," retrieved on Aug. 11, 2010 at <<http://www.grouplens.org/papers/pdf/poly-camera-final.pdf>> Kluwer Academic Publishers, Proceedings of European Conference on Computer Supported Cooperative Work (ECSCW), 2001, pp. 199-218.

Office action for U.S. Appl. No. 12/960,263, dated Jan. 31, 2013, Bruno Jr. et al., "Improving Discoverability Using Behavioral Data," 17 pages.

Office action for U.S. Appl. No. 12/960,267, dated Jan. 31, 2013, Zargahi et al., "Using Behavioral Data to Manage Computer Services," 18 pages.

Office action for U.S. Appl. No. 12/944,899, dated Oct. 23, 2014, Steven Charles Tullis, "Unified Discovery across Application Stores," 25 pages.

Office action for U.S. Appl. No. 12/945,061, dated Nov. 23, 2012, Macbeth et al., "Rich Search Over and Deep Integration with Applications," 25 pages.

Office action for U.S. Appl. No. 12/945,207, dated Dec. 12, 2012, Macbeth et al., "Application Transfer Protocol," 19 pages.

Office action for U.S. Appl. No. 12/945,061, dated Dec. 12, 2014, Macbeth et al., "Rich Search Over and Deep Integration with Applications," 17 pages.

Office action for U.S. Appl. No. 12/944,899, dated Dec. 13, 2012, Tullis et al., "Unified Application Discovery across Application Stores," 24 pages.

Office action for U.S. Appl. No. 12/945,207, dated Feb. 12, 2015, Macbeth et al., "Application Transfer Protocol," 26 pages.

Non-Final Office Action for U.S. Appl. No. 12/944,899, dated Mar. 15, 2012, Steven Charles Tullis et al., "Unified Application Discovery across Application Stores," 23 pages.

Office Action for U.S. Appl. No. 12/960,327, dated Mar. 16, 2012, John Bruno, "Meta-Application Framework," 14 pages.

Office action for U.S. Appl. No. 12/960,267, dated Apr. 17, 2015, Zargahi et al., "Using Behavioral Data to Manage Computer Services," 25 pages.

Office action for U.S. Appl. No. 12/960,327, dated Apr. 7, 2014, Bruno Jr. et al., "Meta-Application Framework," 23 pages.

Office action for U.S. Appl. No. 12/945,061, dated May 10, 2012, Macbeth et al.,"Rich Search Over and Deep Integration with Applications," 19 pages.

Office action for U.S. Appl. No. 12/945,061, dated May 20, 2014, Macbeth et al., "Rich Search Over and Deep Integration with Applications," 14 pages.

Office action for U.S. Appl. No. 12/944,899, dated May 21, 2015, Tullis et al., "Unified Application Discovery across Application Stores," 20 pages.

Office action for U.S. Appl. No. 12/960,263, dated Jun. 11, 2013, Bruno Jr. et al., "Improving Discoverability Using Behavioral Data," 20 pages.

Office action for U.S. Appl. No. 12/960,267, dated Jun. 11, 2013, Zargahi et al., "Using Behavioral Data to Manage Computer Services," 23 pages.

Office action for U.S. Appl. No. 12/945,207, dated Jun. 26, 2012, Macbeth et al., "Application Transfer Protocol," 18 pages.

(56) References Cited

OTHER PUBLICATIONS

Final Office Action for U.S. Appl. No. 12/944,899, dated Jul. 9, 2013, Steven Charles Tullis et al., "Unified Application Discovery across Application Stores," 26 pages.
Office action for U.S. Appl. No. 12/945,207, dated Aug. 12, 2014, Macbeth et al., "Application Transfer Protocol," 22 pages.
Final Office Action for U.S. Appl. No. 12/960,327, dated Aug. 14, 2014, John Bruno, "Meta-Application Framework," 26 pages.
Office action for U.S. Appl. No. 12/960,327, dated Sep. 12, 2012, Bruno Jr. et al., "Meta-Application Framework," 22 pages.
Office Action for U.S. Appl. No. 12/960,267, dated Sep. 18, 2014, Kamran Rajabi Zargahi, "Using Behaviroal Data to Manage Computer Services," 21 pages.
Office action for U.S. Appl. No. 12/960,263, dated Sep. 9, 2014,Bruno Jr. et al., "Improving Discoverability Using Behavioral Data," 21 pages.
Office action for U.S. Appl. No. 12/945,061 dated Sep. 9, 2015, Rucker et al., "Rich Search Over and Deep Integration with Applications," 17 pages.
"Openwave Mobile Analytics suggests new revenue opportunities for operators", retrieved on Jul. 6, 2010 at <<http://www.telecoms.com/18260/openwave-mobile-analytics-suggests-new-revenue-opportunities-for-operators/>>, Telecoms.com, Mobile World Congress, Barcelona, Feb. 16, 2010, pp. 1-6.
Perez, "Mobile Cloud Computing: $9.5 Billion by 2014," retrieved on Jul. 6, 2010 at <<http://www.readwriteweb.com/archives/mobile_cloud_computing_95_billion_by_2014.php>>, ReadWriteWeb, Feb. 23, 2010, pp. 1-4.
U.S. Appl. No. 12/960,263, filed Dec. 3, 2010, Bruno et al., "Improving Discoverability Using Behavioral Data," 45 pages.
U.S. Appl. No. 12/960,267, filed Dec. 3, 2010, Zargahi et al., "Using Behavioral Data to Manage Computer Services," 64 pages.
U.S. Appl. No. 12/960,327, filed Dec. 3, 2010, Bruno et al., "Meta-Application Framework," 42 pages.
Sims, "How to Detect RDS-Specific Application Compatibility Issues by Using the RDS Application Compatibility Analyzer," available at <<http://2x.helpserve.com/knowledgebase/article/View/84/0/how-to-detect-rds-specific-application-compatibility-issues-by-using-the-rds-application-compatibility-analyzer>>, Feb. 12, 2010, 2 pages.
"The Windows NT Registry Database," retrieved on Jul. 3, 2015, available at <<http://scilnet.fortlewis.edu/tech/NT-Server/registry.htm>>, Mar. 7, 2001, 4 pages.
Vax, "Inside the App Store: The New Marketplace for Digital Goods," retrieved on Jul. 6, 2010 at <<http://www.getelastic.com/app-stores/>>, Elastic Path, Mar. 4, 2010, pp. 1-7.
Webster, "Amazon Throws Hat Into Android App Store Ring," retrieved on Oct. 1, 2010 at <<http://www.cnet.com/8301-19736_1-20018078-251.html>>, CNet, Sep. 29, 2010, 2 pages.
Office Action for U.S. Appl. No. 12/944,899, dated Jul. 22, 2016, Steven Charles Tullis et al., "Unified Application Discovery across Application Stores", 27 pages.
Office action for U.S. Appl. No. 12/945,061, dated Mar. 24, 2017, Macbeth et al., "Rich Search Over and Deep Integration with Applications", 20 pages.
Office action for U.S. Appl. No. 12/944,899, dated Apr. 12, 2017, Steven Charles Tullis, "Unified Application Discovery across Application Stores", 26 Pages.
Office action for U.S. Appl. No. 12/960,267, dated May 3, 2017, Zargahi et al., "Using Behavioral Data to Manage Computer Services", 32 pages.
Office action for U.S. Appl. No. 12/945,207, dated Dec. 7, 2016, Macbeth et al., "Application Transfer Protocol", 28 pages.

* cited by examiner

DE-DUPLICATION OF PER-USER REGISTRATION DATA

BACKGROUND

Software applications often must be registered before they can be executed on a computing device. Additionally, in the case of devices having multiple users, an application deployed on the computing device often must be re-registered for each user of the computing device (i.e., "per-user" application registration). While some of the registration data for an application is user specific, some portions of the registration data are identical for all users. Thus, in a per-user application registration system, identical data may be redundantly generated and stored in multiple per-user locations. Not only does this redundancy waste storage space, but it also wastes computation time, as each iteration of the redundant data must be independently computed by the system.

SUMMARY

This application describes techniques to reduce the amount of duplicated application data in a per-user application registration system. Registration of an application includes the creation and storage of registration data, including user registration data and machine registration data. The user registration data may include data and metadata that determine the functionalities of the application in the context of the user (i.e., settings, themes, tiles, etc.). The machine registration data may include at least data and metadata that determine the functionalities of the application in the context of the computing device generally.

The techniques described herein reduce the duplication of identical registration data by storing at least a portion of the identical data in a per-machine location in the system memory where it is accessible to all user accounts. Thus, instead of needing to separately re-compute and/or re-store duplicate registration data in multiple per-user locations in the memory, each user account may access and utilize the registration data stored in the per-machine location. Not only does this reduce system storage costs, but it also reduces the number of tasks needed to be performed during subsequent registrations of the application. Additionally, because portions of the application registration data are user independent, these user-independent portions may be pre-computed and written to a per-machine location in the memory before an interaction with a user occurs.

Pre-computing and storing a portion of the application registration data in a per-machine location in the memory may also allow the system to defer the registration of the application. For example, even though an application may not be fully functional until it is fully registered, the system may precompute data strings for a graphical placeholder representation of the application and write them to the per-machine location in the memory before a first logon experience occurs. Thus, during a first logon experience for a user account, instead of performing computations to register the applications, the computing device may generate the graphical placeholder representation based at least in part on the pre-computed strings.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Overview

Computer devices are often shared by more than one users, each having individual accounts with individual settings and permissions (e.g., wallpapers, themes, parental controls, etc.). Thus computing devices may have multiple user accounts that each make use of at least some common applications. In a per-user application registration model (i.e. model wherein applications are registered with regard to each user account that uses the application), this results in application registration data for an application being calculated and stored for each user account that uses the application. While some of the application registration data is specific to each individual user account (e.g. user registration data), other registration data may be identical for every registration, regardless of the user account. The repeated calculation and storage of this duplicate data wastes both processing time and storage space.

This application describes techniques for reducing the amount of duplicated application registration data in a per-user application registration system, by storing portions of the previously duplicated registration data in a per-machine location (e.g., machine level registry hive, etc.) of the system memory. Registration of an application includes the creation and storage of registration data, the registration data including at least user registration data and machine registration data. The user registration data may include at least data and metadata that determine the functionalities of the application in the context of the user (i.e., settings, tiles, etc.). The machine registration data may include at least data and metadata that determine the functionalities of the application in the context of the computing device generally.

The systems and methods described herein reduce amount of duplicated application registration data in a per-user application registration system, by storing at least a portion of the machine registration data in a per-machine location in the system memory. Therefore, because the per-machine location is accessible to all user accounts, once the machine registration data is stored to the per-machine location it may not need to be re-computed and/or re-written in some examples.

This application also describes techniques for modifying the application registration process to include pre-registration processing of an application at a per-machine level. That is, in an example, a portion of application registration data (e.g. application package, placeholder tile, etc.) may be pre-computed and written to a per-machine location in the system memory before an interaction with a user occurs. For example, a first portion of user-independent application registration data may be written to a per-machine location in the memory before a user account is created and/or a first logon experience for an account is initiated on the computing device. Thus, when the computing device later registers the application with regard to the first user account, at least the first portion of user-independent application registration data does not need to be computed. This reduces the time and processing costs of subsequent application registrations, and may also allow the application to exhibit non-user specific functionality before the application is registered with association with the user.

In some examples, the system may also precompute and store, in the per-machine memory, coding strings for a placeholder version (e.g., a placeholder tile) of an application. Thus, even though the application may require further registration to be fully executable by the user account, a partially functional and/or façade representation of the application may be generated and presented to the user as part of a computing environment without the registration of the application needing to be completed. For example, during a user's initial logon experience, the system may access the precomputed strings stored in the per-machine memory, and generate present a graphical placeholder representation of the application. Then, when generating the computing environment for the user account, instead of including a functional version of the application (which would involve further registration tasks) the environment may instead include the graphical placeholder representation. Because such a process allows for a system to generate a per-user computing environment without fully registering each application, the amount of time required for the system to generate an initial computing environment for a user account may be greatly reduced.

The techniques described herein may be implemented in whole or in part by any computing device, or any combination of one or more elements thereof. By way of example and not limitation, illustrative systems and devices suitable for implementing the techniques are described below with reference to the figures.

Example Architecture

Figure 1:
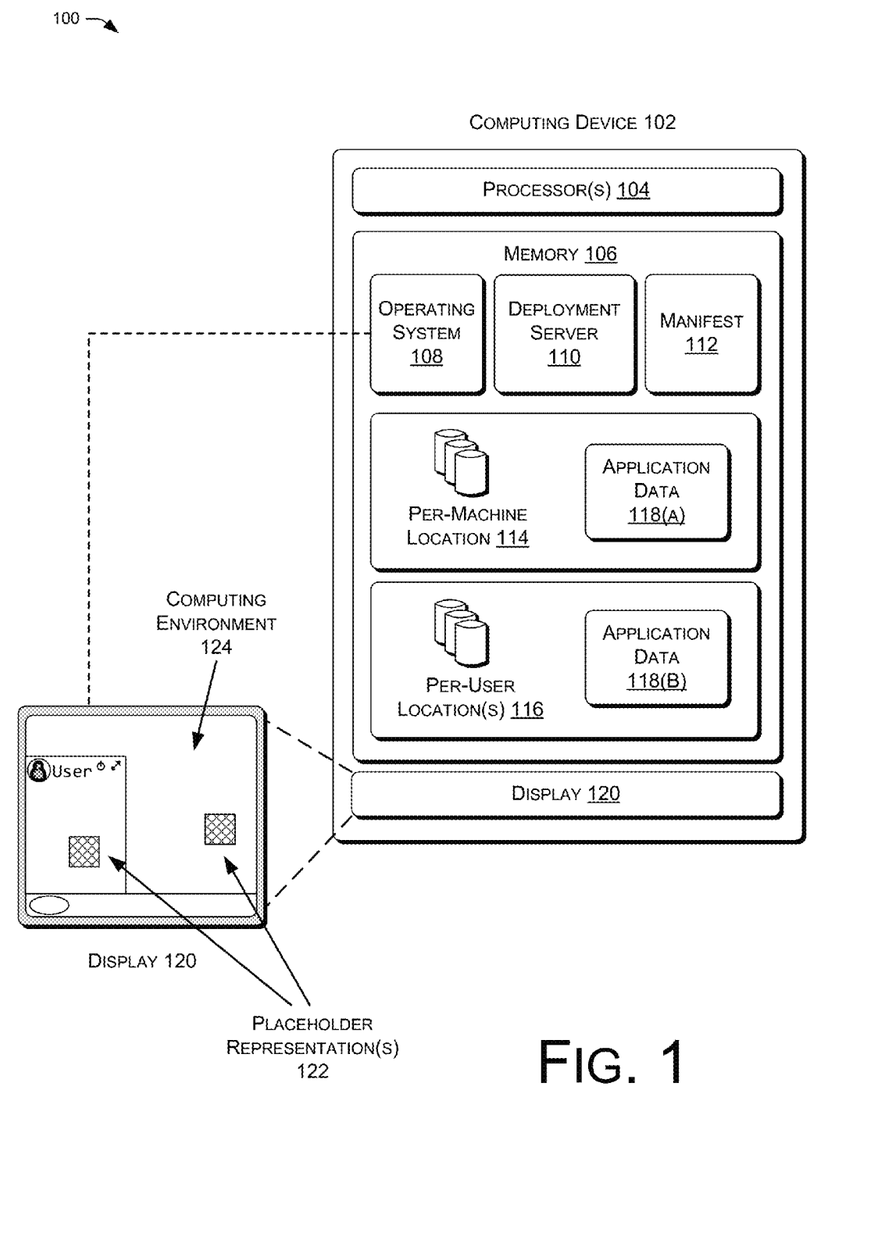
FIG. 1 is a schematic diagram of an example architecture illustrating a computing environment for reducing the amount of duplicated application data in a per-user application registration system.

FIG. 1 is a schematic diagram of an example architecture 100 that illustrates a computing environment for reducing the amount of duplicated application data in a per-user application registration system. Additional details of individual features illustrated in FIG. 1 are described in more detail with reference to subsequent figures.

The architecture 100 includes a computing device 102 including one or more processors 104 and memory 106 communicatively coupled to the processor(s) 104. The client device 102 may be implemented as any type of computing device including, but not limited to, a personal computer, a laptop computer, a tablet computer, a portable digital assistant (PDA), a mobile phone (e.g., a smart phone), an electronic book (e-book) reader, a game console, a set-top box (STB), a smart television (TV), a portable game player, a portable media player, and so forth.

The client device 102 may include an operating system 108, a deployment server 110, and a manifest 112 stored in the memory 106. The memory may further comprise a per-machine location 114 and one or more per-user locations 116 (e.g. user specific registry hive, etc.). Application data 118(A) and 118(B) associated with one or more applications may be computed and stored in the memory. Examples of applications may include a social networking application, a media player, a game, an email or messaging application, a word processing application, a spreadsheet application, a database application, a photo or camera application, a shopping application, or the like. The applications may include native applications (i.e., applications that are preloaded on the client device 102 when it ships), and/or third party applications that have been installed prior or after a first logon to the device.

The per-machine location 114 may include a first portion of application data 118(A) for the system 100. The first portion of application data 118(A) may include non-user specific application data (e.g. application package, placeholder tile, etc.), which may be accessible to all user accounts on the system 100. Individual per-user locations 116 may be associated with a user account, and data stored in a per-user location 116 may be associated the user account. In some examples, access to data stored in an individual per-user location 116 may be limited to one or more user accounts associated with the per-user location 116.

The operating system 108 may register applications on a per-user basis. That is, the operating system 108 may register applications with regard to individual user accounts associated with the computing device 102. For example, the operating system 108 may register an application with regard to a first user account. The registering may include computing and storing user specific registration data (e.g., data and/or metadata governing the functionalities of an application in the context of the user account) for the first user account. This user specific registration data may be stored in a per-user location 116 in the memory 106 associated with the first account. The computing device may then execute the application in the context of the first user account by utilizing a combination of the application data 118(A) stored in the per-machine location 114 and the application data 118(B) (i.e. the user specific registration data) stored in the per-user location 116 associated with the first account.

In some examples, at least a portion of the application data 118(A) that is stored in the per-machine location 114 may be pre-computed and written to the per-machine location 114 before an interaction with a user account occurs. That is, before the creation of a user account and/or a first logon experience for a user account, the system 100 may pre-compute and store user independent application data 118(A) for an application to the per-machine 114 location. Thus, even though the application may require a further per-user registration to be fully executable, a partially functional and/or façade graphical representation of the application can be generated and presented using the application data 118(A).

For example, during a user's initial logon experience, the system 100 may access one or more pre-computed strings stored in the per-machine memory to generate and present on a display 120 one or more placeholder representations 122 of an application, and then present a computing environment 124 for the user account that includes the placeholder representations 122. That is, instead of delaying the presentation of the computer environment 124 until an application is registered with regard to the user, the system 100 may defer such registration and present a computer environment that includes placeholder representations 122 of the application. This operation may save both time and computing cost during the user's initial logon experience, allowing the user to begin using the computing device sooner.

In some examples the application data associated with the placeholder presentation 122 may set a special state that notifies the operating system 108 that the application has not been registered with regard to the user. In some instances, a selection of the placeholder representation 122 may initiate the registration of the application with regard to the user, and/or cause an identifier to be presented on the display 120. In some examples, once the application is fully registered, the system may replace the placeholder representation 122 with the fully functional element associated with the application.

The processor(s) 104 may be configured to execute instructions, applications, or programs stored in the memory 106. In some examples, the processor(s) 104 may include hardware processors that include, without limitation, a hardware central processing unit (CPU), a graphics processing unit (GPU), a field programmable gate array (FPGA), a complex programmable logic device (CPLD), an application specific integrated circuit (ASIC), a system-on-chip (SoC), or a combination thereof.

The memory 106 is an example of a computer-readable media. Computer-readable media may include two types of computer-readable media, namely computer storage media and communication media. Computer storage media may include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read-only memory (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or any other non-transmission medium that may be used to store the desired information and which may be accessed by a computing device, such as client device 102. In general, computer storage media includes computer-executable instructions that, when executed by one or more processors, cause various functions and/or operations described herein to be performed.

In contrast, communication media embody computer-readable instructions, data structures, program modules, or other data in a modulated data signal, such as a carrier wave, or other transmission mechanism. As defined herein, computer storage media does not include communication media.

The architectures, systems, and individual elements described herein may include many other logical, programmatic, and physical components, of which those shown in the accompanying figures are merely examples that are related to the discussion herein.

Example Process for Reducing Duplicate Registration Data

Figure 2:
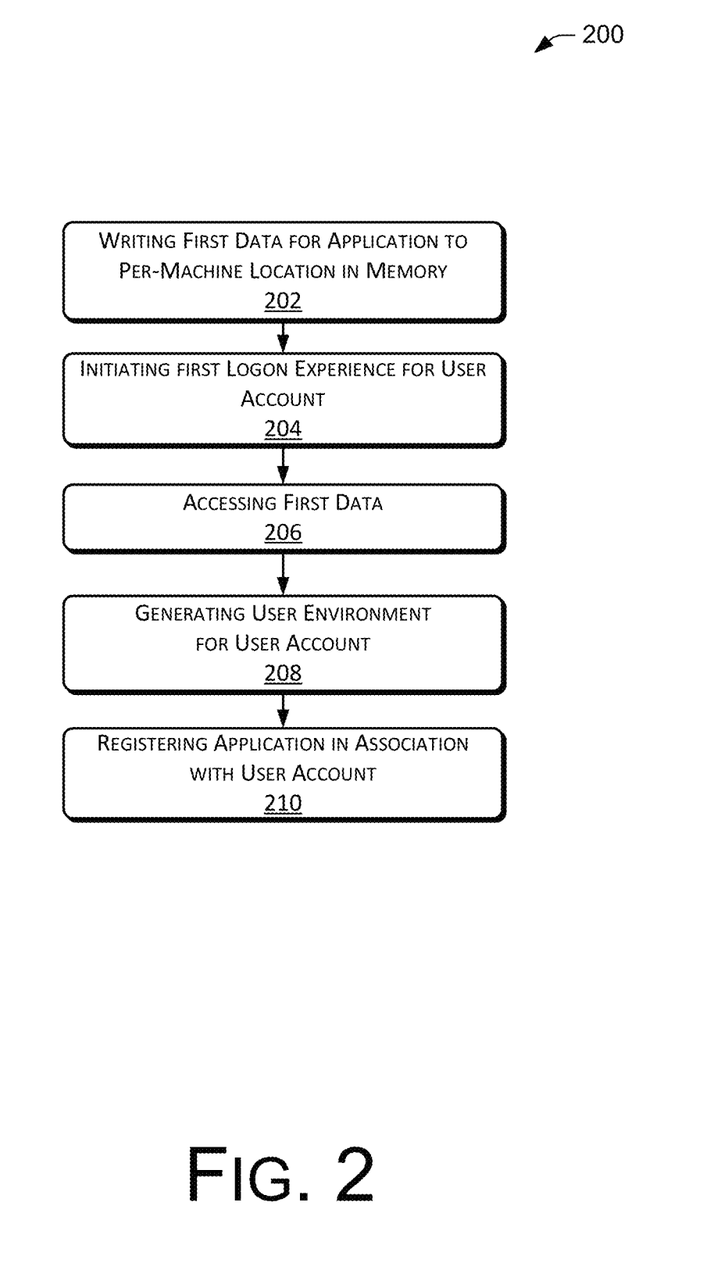
FIG. 2 is a flowchart illustrating an example process for reducing an amount of duplicated application data in a per-user application registration system.

FIG. 2 is a flowchart illustrating an example process 200 for reducing an amount of duplicated application data in a per-user application registration system. The process 200 may be performed as a local operation on an electronic device (e.g., computing device 102). As described in FIG. 1, the client device 102 includes one or more processors 104 and memory 106 communicatively coupled to the processor(s) 104. Additionally, the client device 102 may be implemented as any type of computing device.

As shown in FIG. 2, at operation 202, the electronic device (e.g., client device 102) writes first data for an application to a per-machine location in the memory (e.g. machine registry hive). The first data may include machine registration data for the application, and/or other application data that does not require information about a user account (i.e. data, metadata, coding, artifacts, etc. that don't require information about a user account). The first data may be computed and written to the per-machine location in the memory before the application is registered with regard to a user. In some instances, the first data may be computed and written to the per-machine location in the memory before an interaction with a user occurs.

In some examples, the first data may include one or more coding strings for a placeholder version (e.g., a placeholder tile) of the application. Thus, even though the application may require further registration to be fully executable by a user account, the system may utilize the one or more coding strings to generate a partially functional and/or façade representation of the application without needing to register the application with regard to the user account.

At operation 204, the electronic device initiates a first logon experience for a user account. In some instances, initiation of the first logon experience may be triggered when the electronic device is turned on for the first time, by the creation of a new user account, and/or when a previously existing account is first associated with the electronic device. During the first logon experience the electronic device acquires either actively (i.e., prompting user inputs, etc.) or passively (i.e., accessing system location information, etc.) information about the user.

At operation 206, the electronic device accesses the first data stored in the per-machine location in the memory. As discussed above, this data may include machine registration data for the application and/or other user-independent application data. Because the per-machine location in the memory is accessible to all user accounts, the user account is able to access the first data. In some examples, accessing the first data stored in the per-machine location includes accessing the one or more coding strings.

At operation 208, the electronic device generates a user environment for the user account. The generation of the user environment may be based at least in part on the first data stored in the per-machine location in the memory. In some examples, the user environment may comprise an interactive desktop displayed on a display of (or communicatively coupled to) the electronic device. By way of example and not limitation, the environment may include a window based environment, a tile based environment, a hierarchical index view, or the like. One or more features or settings (e.g. language, wallpaper, icons, tiles, orientations, menus, nameplates, etc.) may be specific to the user account. In some examples the data associated with these features or settings may be stored in a per-user location in the memory associated with the user account.

Generating the user environment may also include registering an additional application that is integral to the user environment (e.g., search widget, settings panel, out of box experience required applications, phone applications, text messaging applications, etc.) with regard to the user account. For example, the electronic device may register an application corresponding to the settings panel of the user environment, so that the user can adjust personal settings once the user environment is presented. As another example, where the electronic device is a phone, generating the user environment may include registering phone and text messaging applications with regard to the user. In this way, upon presentation of the user environment, the user is immediately able to use the electronic device to make phone calls and sent text messages.

In some examples, generating the user environment for the user account may include generating a placeholder representation of the application based at least in part on the first data stored in the per-machine location in the memory. For example, the system may generate a partially functional and/or façade representation of the application based at least in part on the one or more coding strings. The partially functional and/or façade representation of the application can then be presented to the user as a graphical element of the computing environment in lieu of the fully registered application.

The partially functional and/or façade representation may be configured to set a special state that notifies the operating system 108 that the application has not been registered with regard to the user. In some instances, a selection of the partially functional and/or façade representation may initiate the registration of the application with regard to the user, and/or cause an identifier to be presented. The registration of the application may involve reading locally stored data, and/or downloading additional data (e.g., application packages, updates, etc.) over a network. For example, selection of the partially functional and/or façade representation may result in an indicator to be displayed (e.g., greyed out, progress bar, spinning dots or other animation, etc.) to indicate to the user that the computing device is registering the application.

At operation 210, the electronic device registers the application in association with the user account. Registering the application in association with the user account may include computing registration data that is specific to the user account (i.e. settings, tiles, etc.), and writing the user-specific registration data to a per-user location in the memory associated with the user account (e.g. user specific hive). Registering the application may further include computing registration data that is not user-specific. Registering the application in association with the user account may cause the application to be fully functional with regard to the user account. In some examples, once the application is fully registered, the system may present the fully registered application as an element of the computing environment in lieu of partially functional and/or façade representation of the application.

Figure 3:
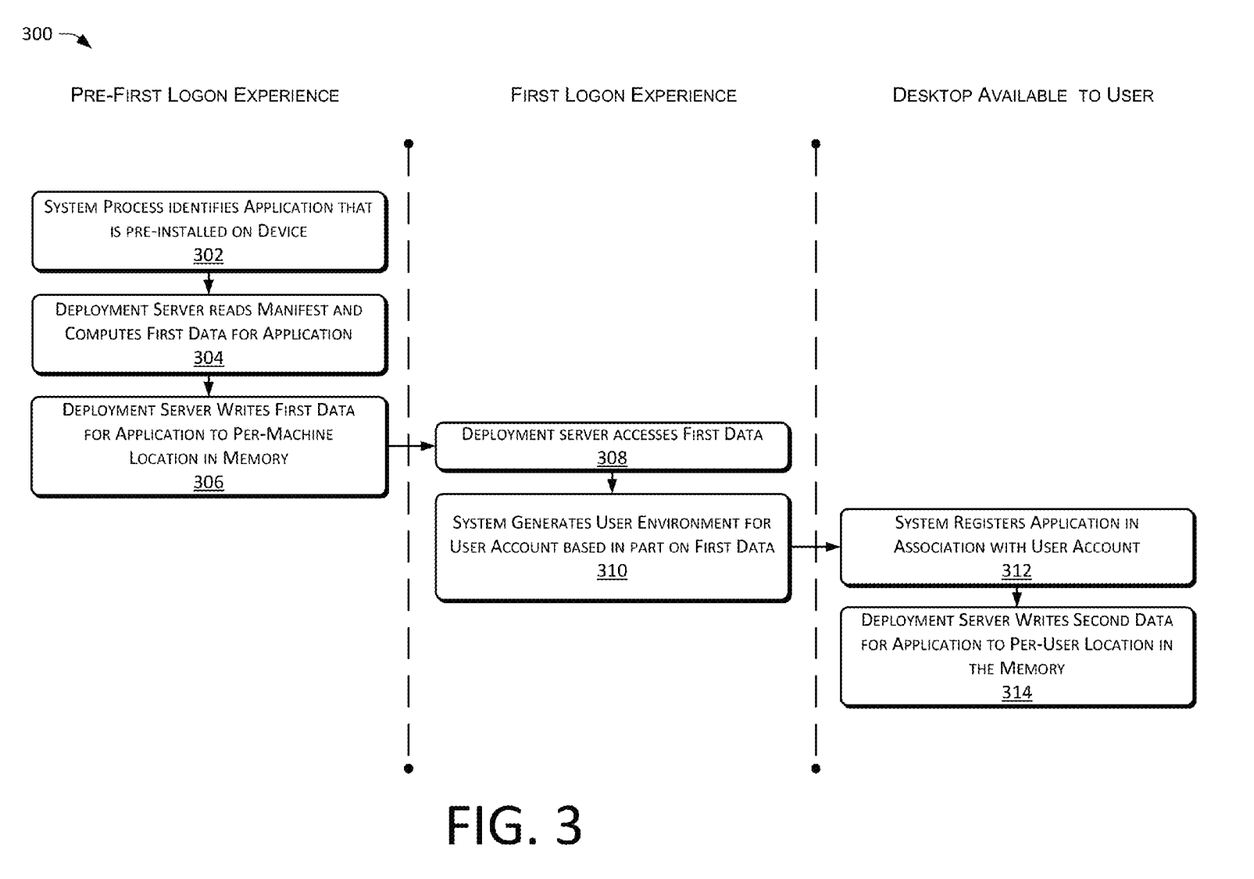
FIG. 3 is a flowchart illustrating an example process of presenting a computing environment to a user in a per-user application system before registering all pre-installed applications.

Example Process for Presenting a Computing Environment before Registering All Applications FIG. 3 illustrates a flowchart of an example process 300 of presenting a computing environment to a user in a per-user application system before registering all pre-installed applications. The process 300 may be performed as a local operation on an electronic device (e.g., computing device 102).

At operation 302, a system process executed on the electronic device identifies an application that is pre-installed on the device. This operation may initiate when the electronic device is first turned on. For example, the process may be initiated when a user first presses the power button on the electronic device. The system process may perform a discover of applications that are pre-installed on the electronic device. These applications may have been installed by one or more of the manufacturer of the electronic device, the developer of the operating system, or another third party.

The system process may perform the discovery before an initial startup application (i.e. an application associated with the out of box experience) is initiated.

At operation 304, a deployment server executed on the electronic device reads the system manifest and computes first data for the application. In some examples, the first data comprises pre-registration data for the pre-installed applications. The deployment server may read the manifest and perform computations associated with the pre-installed applications that have been discovered on the electronic device. For example, the deployment server may digest data that has been preloaded on the electronic device (e.g. resource packs, etc.) and/or compute data associated with one or more pre-installed applications.

The first data may include, for example, machine registration data for the application and/or other application data that does not require information about a user account (e.g., text, logo, artifacts, etc.). In some examples, the data may include one or more coding strings for a placeholder version (e.g., a system entity lacking some or all the protocols of the application) for a pre-installed application. Thus, even though the pre-installed application may require further registration to be fully executable by a user account, the coding strings enable the generation of a partially functional and/or façade representation of the per-installed application before the application is registered with regard to a user account.

At operation 306, the deployment server writes the first data for an application to a per-machine location in the memory of the electronic device (e.g., machine level registration hive). The per-machine location may be accessible to all user accounts associated with the electronic device, obviating a need for a future user accounts to re-compute and/or re-write the data.

In some examples, operations 302 through 306 may be performed concurrently with or immediately after one or more system drivers are installed on the electronic device, and/or before the operating system of the electronic device has been first initiated. For example, the computing device may be preloaded with one or more boot-start drivers that must be installed before the operating system is operable. Alternatively, operations 302 through 306 may be performed during the building process of the operating system before the user takes possession of the electronic device.

At operation 308, the deployment server accesses the first data. As discussed above, the first data may include machine registration data for the application and/or other user-independent application data. Because the per-machine location in the memory is accessible to all user accounts, the user account is able to access the first data. In some examples, accessing the first data stored in the per-machine location includes accessing the one or more coding strings.

Operation 308 may occur after a first logon experience has been initiated for a user. In some instances, initiation of the first logon experience may be triggered when the electronic device is turned on for the first time, by the creation of a new user account, and/or when a previously existing account is first associated with the electronic device.

At operation 310, the electronic device generates or configures a user environment for the user account based in part on the first data. By way of example and not limitation, generation of the user environment may be performed by the operating system, an application running on the operating system (e.g., an application associated with the out of box experience), a deployment engine, a system service, agent, or a combination of the foregoing.

In some examples, the user environment may comprise an interactive desktop displayed on a display of (or communicatively coupled to) the electronic device. By way of example and not limitation, the environment may include a window based environment, a tile based environment, a hierarchical index view, or the like. One or more features or settings (e.g. language, wallpaper, icons, tiles, orientations, menus, nameplates, etc.) may be specific to the user account. In some examples the data associated with these features or settings may be stored in a per-user location in the memory associated with the user account.

In some examples, generating the user environment for the user account may include generating a placeholder representation of the application based at least in part on the first data stored in the per-machine location in the memory. For example, the system may generate a partially functional and/or façade representation of the application based at least in part on the one or more coding strings. The partially functional and/or façade representation of the application can then be presented to the user as an element of the computing environment in lieu of the fully registered application.

The partially functional and/or façade representation may be configured to set a special state that notifies the operating system 108 that the application has not been registered with regard to the user. In some instances, a selection of the partially functional and/or façade representation may initiate the registration of the application with regard to the user, and/or cause an identifier to be presented.

At operation 312, a system of the electronic device registers the application in association with the user account. Registering the application in association with the user account may include computing registration data that is specific to the user account (i.e. settings, tiles, etc.). Registering the application may further include computing registration data that is not user-specific. Registering the application in association with the user account may cause the application to be fully functional with regard to the user account. In some examples, once the application is fully registered, the system may present the fully registered application as an element of the computing environment in lieu of partially functional and/or façade representation of the application.

At operation 314, the deployment server writes second data for the application to a per-user location in the memory. The second data may be written to a per-user location in the memory associated with the user account (e.g. user specific hive). Because the second data is written to the per-user location associated with the user account, other user accounts may not be able to access the second data. Operations 312 and 314 may occur after the desktop (i.e. computing environment) has been presented to the user.

Example Computing Environment

Figure 4:
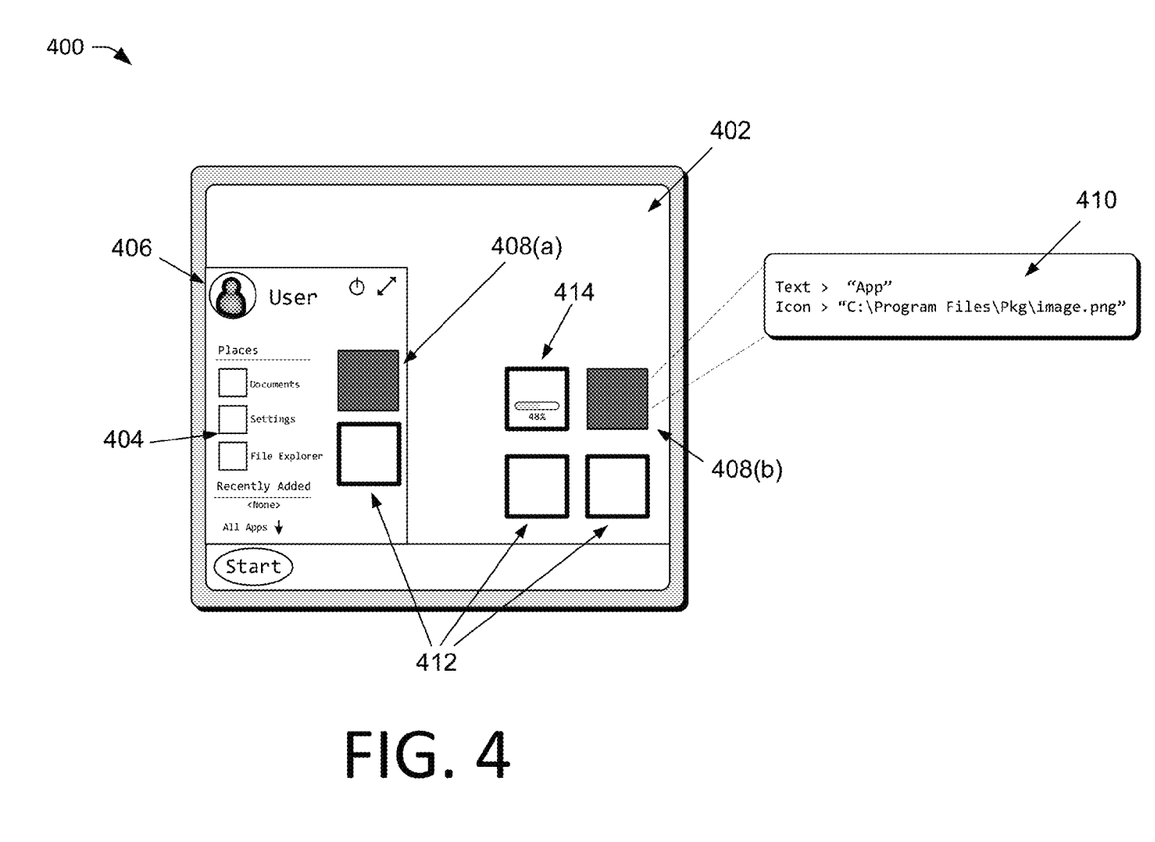
FIG. 4 is a schematic diagram illustrating an example computing environment for a user account.

FIG. 4 illustrates an example computing environment for a user account. The computing environment 400 may be displayed on a display associated with an electronic device (e.g., computing device 102). Additionally, the computing environment may be generated according to any of the processes 200, 300, or 500, any portion of these processes, or according to other means.

The computing environment may comprise an interactive desktop 402 displayed on a display of the electronic device. The interactive desktop may include an interactive start menu 404, as well as one or more other functional elements, such as menus 404, task bars, icons, etc. One or more features or settings (e.g. language, wallpaper, icons, tiles, orientations, nameplates 406, etc.) may be specific to the user account. In some examples the data associated with these features or settings may be stored in a per-user location in the memory associated with the user account.

In some examples, the computing environment 402 may include a placeholder representation 408. The placeholder representation may comprise a placeholder icon/tile 408(a) located in a functional element of the display (i.e. menu), and/or a placeholder icon/tile 408(b) located on the interactive desktop 402. For example, the placeholder icon/tile may be a partially functional and/or façade representation of the application based at least in part on one or more coding strings 410 stored in a per-machine location in the memory. The partially functional and/or façade representation of the application can then be presented to the user as an element of the interactive desktop 402 in lieu of the fully registered application. In some examples, the computing environment 402 may also include graphical representations of fully registered applications 412.

The partially functional and/or façade representation may be configured to look similar and/or identical to a fully functional replication of the application to a user viewing the interactive desktop 402. The partially functional and/or façade representation may be configured to set a special state that notifies the operating system that the application with which the representation is associated has not been registered with regard to the user. In some instances, a selection of the partially functional and/or façade representation may initiate the registration of the application with regard to the user, and/or cause an identifier to be presented. For example, once a partially functional and/or façade representation is selected, the computing environment 402 may include an indicator 414 (i.e., progress bar, etc.) to indicated that the application is currently being registered. Once the application is fully registered, the system may present the fully registered application 412 as an element of the computing environment in lieu of partially functional and/or façade representation.

Example Process for Registering an Application to Multiple Users

Figure 5:
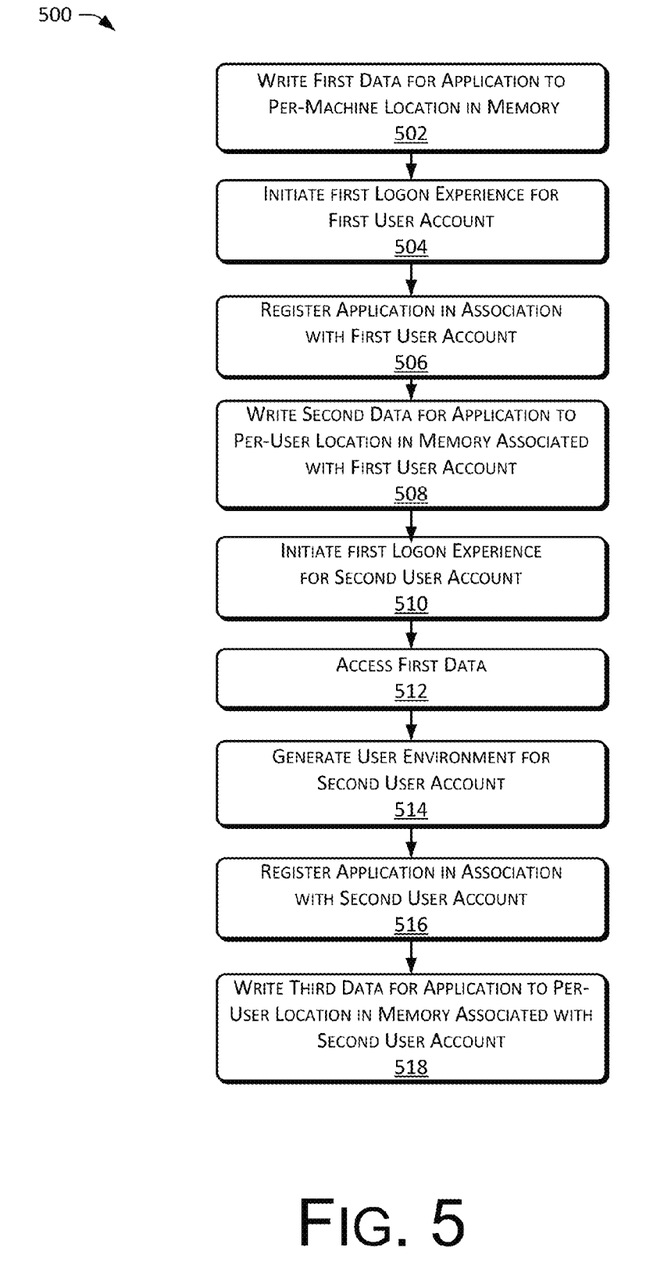
FIG. 5 is a flowchart illustrating an example process usable to register an application to multiple users in a per-user registration system.

FIG. 5 is a flowchart illustrating an example process 500 usable to register an application to multiple users in a per-user registration system. The process 500 may be performed as a local operation on an electronic device (e.g., computing device 102).

As shown in FIG. 5, at operation 502, the electronic device (e.g., client device 102) writes first data for an application to a per-machine location in the memory. The first data may include machine registration data for the application, and/or other application data that does not require information about a user account. The first data may be computed and written to the per-machine location in the memory before the application is registered with regard to a user. In some instances, the first data may be computed and written to the per-machine location in the memory before an interaction with a user occurs.

In some examples, the first data may include one or more coding strings for a placeholder version of the application. Thus, even though the application may require further registration to be fully executable by a user account, they system may utilize the one or more coding strings to generate a partially functional and/or façade representation of the application without needing to register the application with regard to the user account.

At operation 504, the electronic device initiates a first logon experience for a first user account. In some instances, initiation of the first logon experience may be triggered when the electronic device is turned on for the first time, by the creation of the first user account, and/or the first time the first user account is associated with the electronic device. During the first logon experience the electronic device acquires, either actively or passively, information about the first user.

At operation 506, the electronic device registers the application in association with the first user account. Registering the application in association with the first user account may include computing registration data that is specific to the first user account (i.e. settings, tiles, etc.). Registering the application may further include computing registration data that is not specific to the first user. Registering the application in association with the first user account may cause the application to be fully functional with regard to the first user account.

At operation 508, the electronic device writes second data for the application to a per-user location in the memory associated with the first user account. Writing the second data to the per-user location associated with the first user may include writing the user-specific registration data for the first user account to a per-user location in the memory associated with the first user account. For example, the per-user location in the memory associated with the first user account may be a user specific hive for the first user account. Due to its location in the per-user location associated with the first user account, other user accounts may not be able to access the second data.

At operation 510, the electronic device initiates a first logon experience for a second user account, the first user account being different from the second user account. In some instances, initiation of the first logon experience may be triggered by the creation of the second user account, and/or the first time the second user account is associated with the electronic device. During the first logon experience the electronic device acquires (either actively or passively) information about the second user.

At operation 512, the electronic device accesses the first data stored in the per-machine location in the memory. As discussed above, this data may include machine registration data for the application and/or other user-independent application data. Because the per-machine location in the memory is accessible to all user accounts, the second user account is able to access the first data. In some examples, accessing the first data stored in the per-machine location includes accessing the one or more coding strings.

At operation 514, the electronic device generates a user environment for the second user account. The generation of the user environment may be based at least in part on the first data stored in the per-machine location in the memory. In some examples, the user environment may comprise an interactive desktop displayed on a display of (or communicatively coupled to) the electronic device. By way of example and not limitation, the environment may include a window based environment, a tile based environment, a hierarchical index view, or the like. One or more features or settings (e.g. language, wallpaper, icons, tiles, orientations, menus, nameplates, etc.) may be specific to the second user account. In some examples the data associated with these features or settings may be stored in a per-user location in the memory associated with the second user account.

In some examples, generating the user environment for the second user account may include generating a placeholder representation of the application based at least in part on the first data stored in the per-machine location in the memory. For example, the system may generate a partially functional and/or façade representation of the application based at least in part on the one or more coding strings. The partially functional and/or façade representation of the application can then be presented to the second user as an element of the computing environment in lieu of the fully registered application.

The partially functional and/or façade representation may be configured to set a special state that notifies the operating system 108 that the application has not been registered with regard to the second user. In some instances, a selection of the partially functional and/or façade representation may initiate the registration of the application with regard to the second user, and/or cause an identifier to be presented.

At operation 516, the electronic device registers the application in association with the second user account. Registering the application in association with the second user account may include computing registration data that is specific to the second user account (i.e. settings, tiles, etc.). Registering the application may further include computing registration data that is not specific to the second user. Registering the application in association with the second user account may cause the application to be fully functional with regard to the second user account. In some examples, once the application is fully registered in association with the second account, the system may present the fully registered application as an element of the computing environment in lieu of partially functional and/or façade representation of the application.

At operation 518, the electronic device writes third data for the application to a per-user location in the memory associated with the second user account. Writing the third data to the per-user location associated with the second user may include writing the user-specific registration data for the second user account to a per-user location in the memory associated with the second user account. For example, the per-user location in the memory associated with the second user account may be a user specific hive for the second user account. Due to its location in the per-user location associated with the second user account, other user accounts may not be able to access the third data.

Example Process for Deferred Application Registration

Figure 6:
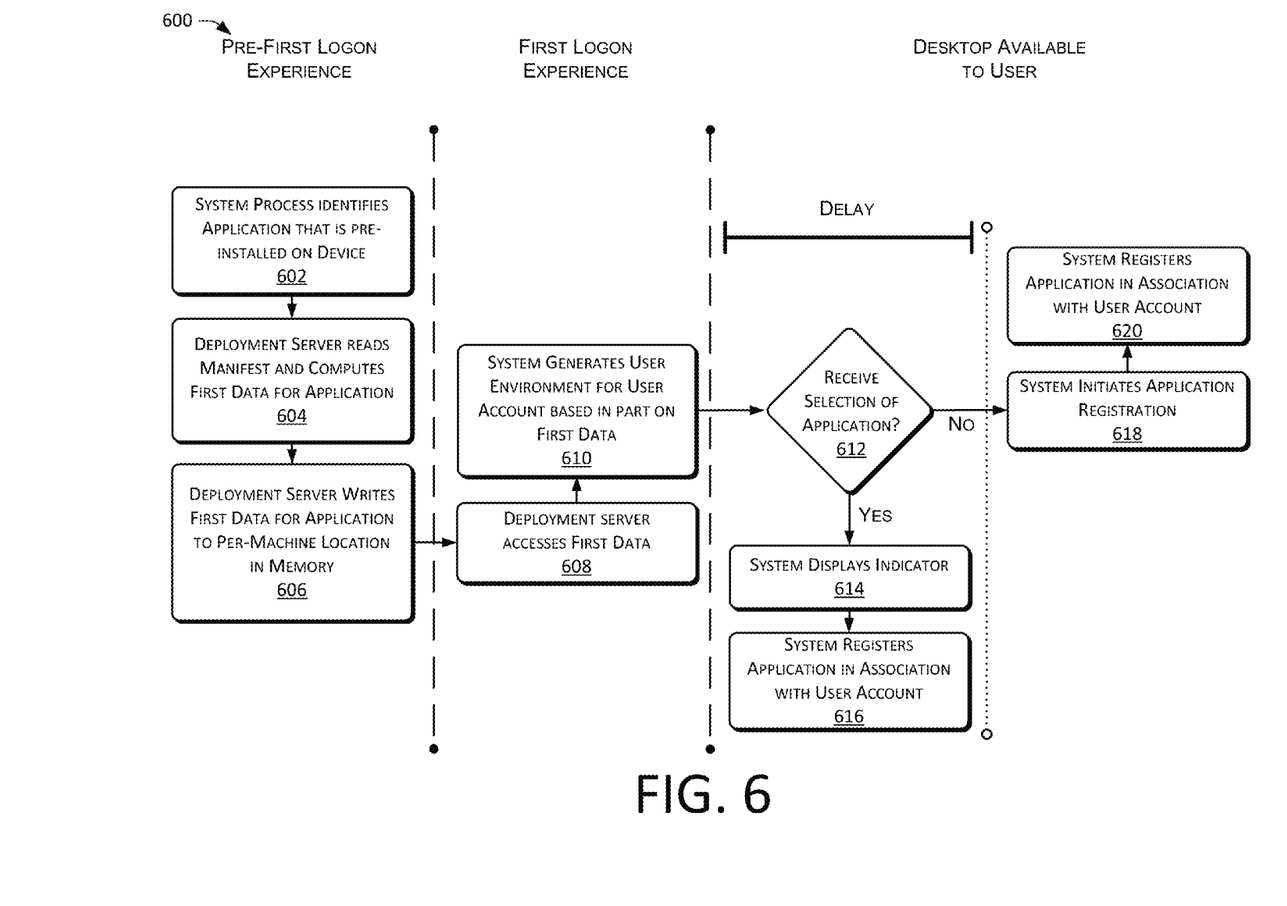
FIG. 6 is a flowchart illustrating an example process of deferring per-user application registration.

FIG. 6 illustrates a flowchart of an example process 600 of deferring the application registration. The process 600 may be performed as a local operation on an electronic device (e.g., computing device 102).

At operation 602, a system process executed on the electronic device identifies an application that is pre-installed on the device. This operation may initiate when the electronic device is first turned on. For example, the process may be initiated when a user first presses the power button on the electronic device. The system process may perform a discover of applications that are pre-installed on the electronic device. These applications may have been installed by one or more of the manufacturer of the electronic device, the developer of the operating system, or another third party. The system process may perform the discovery before an initial startup application (i.e. an application associated with the out of box experience) is initiated.

At operation 604, a deployment server executed on the electronic device reads the system manifest and computes first data for the application. In some examples, the first data comprises pre-registration data for the pre-installed applications. The deployment server may read the manifest and perform computations associated with the pre-installed applications that have been discovered on the electronic device. For example, the deployment server may digest data that has been preloaded on the electronic device (e.g. resource packs, etc.) and/or compute data associated with one or more pre-installed applications.

The first data may include, for example, machine registration data for the application and/or other application data that does not require information about a user account (e.g., text, logo, artifacts, etc.). In some examples, the data may include one or more coding strings for a placeholder version (e.g., a system entity lacking some or all the protocols of the application) for a pre-installed application. Thus, even though the pre-installed application may require further registration to be fully executable by a user account, the coding strings enable the generation of a partially functional and/or façade representation of the per-installed application before the application is registered with regard to a user account.

At operation 606, the deployment server writes the first data for an application to a per-machine location in the memory of the electronic device (e.g., machine level registration hive). The per-machine location may be accessible to all user accounts associated with the electronic device, obviating a need for a future user accounts to re-compute and/or re-write the data.

In some examples, operations 602 through 606 may be performed concurrently with or immediately after one or more system drivers are installed on the electronic device, and/or before the operating system of the electronic device has been first initiated. For example, the computing device may be preloaded with one or more boot-start drivers that must be installed before the operating system is operable. Alternatively, operations 602 through 606 may be performed during the building process of the operating system before the user takes possession of the electronic device.

At operation 608, the deployment server accesses the first data. As discussed above, the first data may include machine registration data for the application and/or other user-independent application data. Because the per-machine location in the memory is accessible to all user accounts, the user account is able to access the first data. In some examples, accessing the first data stored in the per-machine location includes accessing the one or more coding strings.

Operation 608 may occur after a first logon experience has been initiated for a user. In some instances, initiation of the first logon experience may be triggered when the electronic device is turned on for the first time, by the creation of a new user account, and/or when a previously existing account is first associated with the electronic device.

At operation 610, the electronic device generates or configures a user environment for the user account based in part on the first data. By way of example and not limitation, generation of the user environment may be performed by the operating system, an application running on the operating system (e.g., an application associated with the out of box experience), a deployment engine, a system service, agent, or a combination of the foregoing.

In some examples, the user environment may comprise an interactive desktop displayed on a display of (or communicatively coupled to) the electronic device. By way of example and not limitation, the environment may include a window based environment, a tile based environment, a hierarchical index view, or the like. One or more features or settings (e.g. language, wallpaper, icons, tiles, orientations, menus, nameplates, etc.) may be specific to the user account. In some examples the data associated with these features or settings may be stored in a per-user location in the memory associated with the user account.

Generating the user environment may also include registering an additional application that is vital to the user environment (e.g., search widget, settings panel, out of box experience required applications, phone applications, text messaging applications, etc.) with regard to the user account. For example, the electronic device may register an application corresponding to the settings panel of the user environment, so that the user can adjust personal settings once the user environment is presented. As another example, where the electronic device is a phone, generating the user environment may include registering phone and text messaging applications with regard to the user. In this way, upon presentation of the user environment, the user is immediately able to use the electronic device to make phone calls and sent text messages.

In some examples, generating the user environment for the user account may include generating a placeholder representation of the application based at least in part on the first data stored in the per-machine location in the memory. For example, the system may generate a partially functional and/or façade representation of the application based at least in part on the one or more coding strings. The partially functional and/or façade representation of the application can then be presented to the user as an element of the computing environment in lieu of the fully registered application. The partially functional and/or façade representation may be configured to set a special state that notifies the operating system 108 that the application has not been registered with regard to the user. In some instances, the user environment may also include a graphical representations of a fully registered application.

Block 612 represents a determination of whether a selection of the application occurs during a delay after the user environment (i.e., desktop) is presented to the user. This delay may correspond to a set amount of time, a series of operations that must occur first (e.g., the registration of a more vital applications, features of the user environment, etc.), a threshold processing load being achieved (e.g., the processing load has dropped below a pre-determined threshold value, etc.) or any combination thereof. For example, once the user environment is presented to the user but before a pre-set amount of time has expired, the user may select to execute the unregistered application. In some examples, the selection of the application may correspond to a selection of the partially functional and/or façade representation.

If a selection of the application is received during the delay, the process continues to operation 614, wherein the system displays an indicator to identify that the application is being registered with regard to the user account. For example, a selection of the partially functional and/or façade representation may result in an indicator to be displayed (e.g., greyed out, progress bar, spinning dots or other animation, etc.) to indicate to the user that the computing device is registering the application.

At operation 616, a system of the electronic device registers the application in association with the user account. Registering the application in association with the user account may include computing registration data that is specific to the user account (i.e. settings, tiles, etc.). Registering the application may further include computing registration data that is not user-specific. Registering the application in association with the user account may cause the application to be fully functional with regard to the user account. In some examples, once the application is fully registered, the system may present the fully registered application as an element of the computing environment in lieu of partially functional and/or façade representation of the application.

In some examples, the system may store a queue of unregistered applications that need to be registered with regard to the user account. Receiving the selection of the application may cause the application to be removed from the queue.

If a selection of the application is not received during the delay, the process continues to operation 618, wherein the system initiates the registration of the application with regard to the user account after the delay has expired. For example, once a pre-set amount of time has expired from when the user environment is presented to the user, the system may automatically begin registering the application with regard to the user account. In some examples, the system may maintain a queue of applications that have yet to be registered with regard to the user account. In such instances, initiating application registration may include initiating the registration of the application based at least partly upon to the queue.

At operation 620, a system of the electronic device automatically registers the application in association with the user account. Registering the application in association with the user account may include computing registration data that is specific to the user account (i.e. settings, tiles, etc.). In some examples, the automatic registration of the application may be assigned a low processing priority (e.g., CPU priority) value, and/or may occur as a background process. Registering the application may further include computing registration data that is not user-specific. Registering the application in association with the user account may cause the application to be fully functional with regard to the user account. In some examples, once the application is fully registered, the system may present the fully registered application as an element of the computing environment in lieu of partially functional and/or façade representation of the application.

By deferring, the registration of the application until after the delay has expired, the system reduces the amount of processing that occurs during the first login experience. That is, by not registering the application while the electronic device is bogged down with the heavy processing load inherent to the first login experience, the generation and presentation of the user environment may occur faster. Additionally, because the deferred registration of the application may occur as a background operation during a time that the user is otherwise able to interact with the user environment, the registration delay that a user would previously have had to experience may be completely eliminated.

The processes 200, 300, 500, and 600 are described with reference to the architecture of FIG. 1 for convenience and ease of understanding. However, the processes 200, 300, 500, and 600 are not limited to being performed using the architecture 100. Moreover, the architecture 100 is not limited to performing the processes 200, 300, 500, and 600.

The processes 200, 300, 500, and 600 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some examples, one or more blocks of the process may be omitted entirely. Moreover, the processes 200, 300, 500, and 600 may be combined in whole or in part.

The various techniques described herein may be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

In closing, although the various examples have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computing device, comprising:
   at least one processing unit; and
   memory configured to be in communication with the at least one processing unit, the memory storing instructions that based on execution by the at least one processing unit, cause the at least one processing unit to:
   write application pre-registration registry data for an unregistered application to the memory, the application pre-registration registry data defining a graphical representation of the unregistered application;
   initiate a first logon experience to an operating system of the computing device for a user account;
   generate, based at least in part on the application pre-registration registry data, a system environment for the user account, the system environment comprising the graphical representation of the unregistered application;
   determine whether a selection of the graphical representation of the unregistered application is received within a scheduled time for registering the unregistered application after the system environment is generated; and
   install, upon expiration of the scheduled time for registering and based on a determination that the selection of the graphical representation of the unregistered application is not received, registration data to the memory that causes the application to be fully functional.

2. The computing device of claim 1, wherein the graphical representation of the unregistered application is associated with information notifying the computing device that the application is not fully registered.

3. The computing device of claim 1 wherein the instructions further cause the at least one processing unit to:
receive the selection of the graphical representation of the unregistered application; and
based at least in part on the selection of the graphical representation, register the application in association with the user account ahead of the scheduled time for registering the application.

4. The computing device of claim 3, wherein the instructions further cause the at least one processing unit to display, based upon the selection of the graphical representation, an identifier indicating that the application is being registered in association with the user account.

5. The computing device of claim 1, wherein the application pre-registration registry data is written to a per-machine location in the memory, and wherein the instructions further cause the at least one processing unit to:
register the application in association with the user account, the registering comprising writing at least a portion of registration data to a per-user location in the memory associated with the user account.

6. The computing device of claim 5, wherein the user account is a first user account, and the system environment is a first system environment, the instructions further cause the at least one processing unit to:
initiate a first logon experience for a second user account; and
generate, based partly on the application pre-registration registry data, a second system environment for the second user account, the system environment comprising the graphical representation of the unregistered application.

7. The computing device of claim 1, wherein the application pre-registration registry data for the unregistered application is written to a machine registry hive and comprises a pre-resolved string, and wherein the graphical representation of the unregistered application is generated based at least in part on the pre-resolved string.

8. A method comprising:
writing, by a processing unit of a computing device, application pre-registration registry data for an unregistered application to a memory of the computing device, the application pre-registration registry data defining a graphical representation of the unregistered application;
initiating, by the computing device, a first logon experience to an operating system of the computing device for a user account;
generating, by the processing unit and based at least partly on the application pre-registration registry data, a system environment for the user account, the system environment comprising the graphical representation of the unregistered application;
determining whether a selection of the graphical representation of the unregistered application is received within a scheduled time for registering the unregistered application after the system environment is generated; and
installing, upon expiration of the scheduled time for registering and based on a determination that the selection of the graphical representation of the unregistered application is not received, registration data to the memory that causes the application to be fully functional.

9. The method of claim 8, wherein the graphical representation of the unregistered application is associated with information notifying the computing device that the application is not fully registered.

10. The method of claim 8, further comprising:
receiving, by the computing device, the selection of the graphical representation of the unregistered application; and
based at least in part on the selection of the graphical representation, registering the application in association with the user account ahead of the scheduled time for registering the application.

11. The method of claim 10, further comprising displaying, based upon the selection of the graphical representation, an identifier indicating that the application is being registered in association with the user account.

12. The method of claim 8, wherein the application pre-registration registry data is written to a per-machine location in the memory, and wherein the method further comprises:
registering the application in association with the user account, the registering comprising writing at least a portion of registration data to a per-user location in the memory associated with the user account.

13. The method of claim 12, wherein the user account is a first user account, and the system environment is a first system environment, the method further comprising:
initiating, by the computing device, a first logon experience for a second user account; and
generating, by the processing unit and based at least partly on the application preregistration registry data, a second system environment for the second user account, the system environment comprising the graphical representation of the unregistered application.

14. The method of claim 8, wherein the application pre-registration registry data for the unregistered application comprises a pre-resolved string, and wherein the graphical representation of the unregistered application is generated based at least in part on the pre-resolved string.

15. A computing device, comprising:
at least one processing unit; and
memory configured to be in communication with the at least one processing unit, the memory storing instructions that based on execution by the at least one processing unit, cause the at least one processing unit to:
write application pre-registration registry data for an unregistered application to a per-machine location in the memory of the computing device, where the per-machine location in the memory is accessible to all user accounts associated with the computing device;
initiate a first logon experience for a user account;
generate, based at least in part on the application pre-registration registry data, a system environment for the user account, the system environment comprising the graphical representation of the unregistered application;
determine whether a selection of the graphical representation of the unregistered application is received within a scheduled time for registering the unregistered application after the system environment is generated; and
register the unregistered application in association with the user account upon expiration of the scheduled time for registering based on a determination that the selection of the graphical representation of the unregistered application is not received, the registering comprising writing at least a portion of registration data to a per-user location in the memory associated with the user account, wherein the portion of the registration data written to the per-user location in the memory is not accessible to other user accounts.

16. The computing device of claim 15, wherein the application pre-registration registry data for the unregistered application comprises a pre-resolved string, and wherein generating the system environment for the user account comprises generating a graphical representation of the unregistered application based at least in part on the pre-resolved string.

17. The computing device of claim 15, wherein the registering the unregistered application is based at least in part upon a selection of a graphical representation of the unregistered application.

18. The computing device of claim 17, wherein the portion of registration data is a first portion of registration data, and wherein the registering further comprises writing at least a second portion of registration data to the per-machine location in the memory of the computing device.

19. The computing device of claim 17, wherein the user account is a first user account, and the system environment is a first system environment, the instructions further cause the at least one processing unit to:

initiate a first logon experience for a second user account; and generate, based partly on the application pre-registration registry data, a second system environment for the second user account.

20. The computing device of claim 19, wherein the registration data is first registration data, and wherein the per-user location is a first per-user location, and wherein the instructions further cause the at least one processing unit to register the application in association with the second user account, the registering comprising writing at least a portion of second registration data to a second per-user location in the memory associated with the second user account.

* * * * *